United States Patent
Leone et al.

(10) Patent No.: US 11,608,192 B2
(45) Date of Patent: Mar. 21, 2023

(54) DRONE ELEVATOR SYSTEMS AND METHODS

(71) Applicant: Ford Global Technologies, LLC, Dearborn, MI (US)

(72) Inventors: Thomas Leone, Ypsilanti, MI (US); Kenneth Miller, Pinckney, MI (US); Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 767 days.

(21) Appl. No.: 16/406,841

(22) Filed: May 8, 2019

(65) Prior Publication Data
US 2020/0361631 A1 Nov. 19, 2020

(51) Int. Cl.
*B64F 1/04* (2006.01)
*B64D 3/00* (2006.01)
*B64C 39/02* (2006.01)

(52) U.S. Cl.
CPC .............. *B64F 1/04* (2013.01); *B64C 39/024* (2013.01); *B64D 3/00* (2013.01); *B64C 2201/08* (2013.01); *B64C 2201/082* (2013.01); *B64C 2201/128* (2013.01); *B64C 2201/206* (2013.01)

(58) Field of Classification Search
CPC .......... B64F 1/04; B64F 1/08; B64C 2201/08; B64C 2201/088
See application file for complete search history.

(56) References Cited

U.S. PATENT DOCUMENTS

| | | | | |
|---|---|---|---|---|
| 2,488,050 A | * | 11/1949 | Brodie | B64F 1/04 244/11 OF |
| 3,163,380 A | * | 12/1964 | Brodie | B64F 1/04 188/62 |
| 6,874,729 B1 | * | 4/2005 | McDonnell | B64F 1/10 244/63 |

(Continued)

FOREIGN PATENT DOCUMENTS

| | | | | |
|---|---|---|---|---|
| CN | 106005462 A | | 10/2016 | |
| CN | 107792371 A | * | 3/2018 | ............... B64D 5/00 |

OTHER PUBLICATIONS

English Translation of CN 107792371 (Year: 2018).*

(Continued)

*Primary Examiner* — Nicholas McFall
*Assistant Examiner* — Marisa V Conlon
(74) *Attorney, Agent, or Firm* — Brandon Hicks; Eversheds Sutherland (US) LLP

(57) ABSTRACT

This disclosure is generally directed to systems and methods for lifting drones to a desired height before launching. In one exemplary embodiment, a drone elevator system includes a looped cable that is engaged to a pair of pulleys. A first pulley of the pair of pulleys is coupled to a lighter-than-air craft and the second pulley is attached to a motor. The lighter-than-air craft moves upwards so as to raise the first pulley skywards and place the looped cable at an angle with respect to the ground. The motor is then operated to rotate the second pulley for moving the looped cable. The cable includes a set of tethers each of which is used to tether a drone. Each tether includes an extension arm that prevents the tethered drone from making contact with the cable when being lifted. Each tethered drone can be launched after being lifted to a desired height.

20 Claims, 4 Drawing Sheets

(56) References Cited

U.S. PATENT DOCUMENTS

| | | | |
|---|---|---|---|
| 7,143,974 B2* | 12/2006 | Roeseler | B64C 39/024 244/63 |
| 8,181,906 B2 | 5/2012 | Koessler et al. | |
| 10,556,709 B1* | 2/2020 | Kimchi | B64C 39/024 |
| 11,066,185 B2* | 7/2021 | Dennis | B64F 1/029 |
| 11,142,339 B2* | 10/2021 | Dennis | B64C 39/022 |
| 11,204,612 B2* | 12/2021 | von Flotow | G05D 1/0858 |
| 2005/0017129 A1 | 1/2005 | McDonnell | |
| 2016/0375981 A1* | 12/2016 | McDonnell | B64C 39/024 244/13 |
| 2017/0225784 A1* | 8/2017 | Hayes | B64D 5/00 |
| 2018/0245365 A1 | 8/2018 | Wankewycz | |
| 2019/0071176 A1* | 3/2019 | von Flotow | B66D 1/46 |

OTHER PUBLICATIONS

Rapp, et al., "Vertical Takeoff and Landing of Flexible Wing Kite Power Systems," Journal of Guidance, Control, and Dynamics 2018, vol. 41, No. 11, pp. 1-15. doi: 10.2514/1.G003535.

* cited by examiner

DRONE ELEVATOR SYSTEMS AND METHODS

FIELD OF THE DISCLOSURE

This disclosure generally relates to drones, and more particularly relates to elevating one or more drones as a part of a launch procedure.

BACKGROUND

Drones are currently being used by military personnel for delivering various types of armaments such as bombs and missiles and are also being used in civilian applications for delivering various types of articles such as medical supplies and relief packages. The range of operation of a drone is typically determined by parameters such as a bodyweight of the drone, a load-carrying capacity of the drone, an efficiency of a motor used for moving the propellers in the drone, an aerodynamic shape of the drone, and a capacity of the onboard battery system or fuel tank to provide power to the motor.

Drone designers are attempting to improve on these various parameters such as by improving a bodyweight-to-load carrying capacity of a drone and by improving the type of batteries used in the drone. Drone users are also attempting to improve on the performance of drones by attempting different ways to operate the drones so as to extend flight time and conserve battery power. In at least some cases, a longer flight time can translate to a greater distance over which a drone can travel. In the case of a delivery drone, the greater distance may allow extending delivery services to a larger number of customers over a larger coverage area.

One aspect that requires addressing when attempting to conserve battery power of the onboard batteries of a drone is minimizing the amount of power consumed by the motor when the drone lifts off from the ground. At this time, the propellers are working against gravity to lift the drone. Consequently, a significant amount of power is drained from the batteries prior to the drone reaching an altitude at which the drone can move forward towards a destination. One traditional approach for addressing this issue involves carrying a drone aloft in an aircraft to a suitable height before releasing the drone. However, this traditional approach may be impractical in some applications and may be expensive as well. For example, it may be impractical to use an aircraft for launching a drone in an urban area, particularly when multiple delivery runs have to be made by the drone on a recurring basis.

It is therefore desirable to provide solutions for conserving battery power of a drone by launching the drone from an elevated position in a cost-effective manner.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
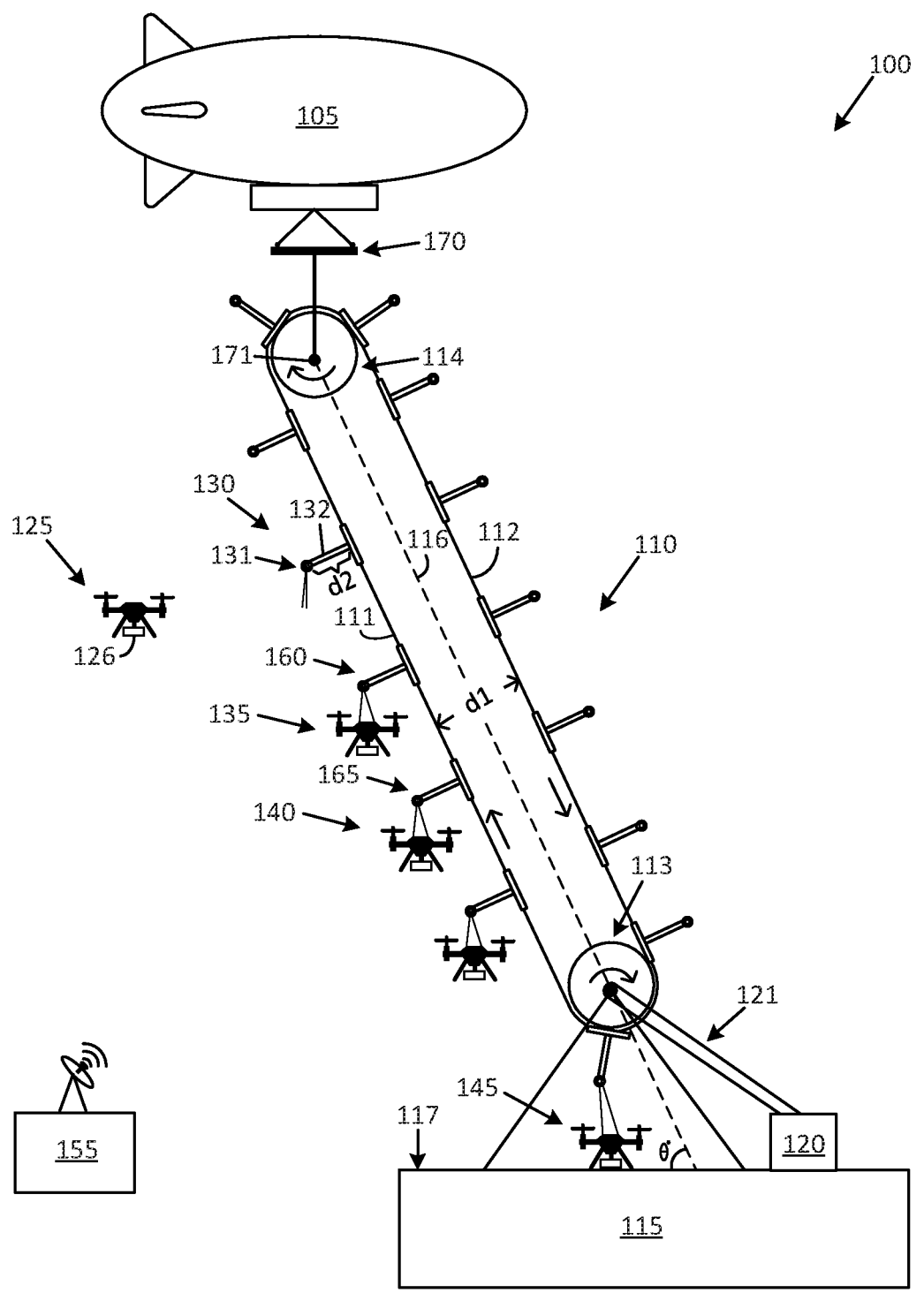
FIG. 1 illustrates a first exemplary embodiment of a drone elevator system in accordance with the disclosure.

The disclosure will be described more fully hereinafter with reference to the accompanying drawings, in which exemplary embodiments of the disclosure are shown. This disclosure may, however, be embodied in many different forms and should not be construed as limited to the exemplary embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described exemplary embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular component such as a first processor in a first computer may be performed by another component such as a second processor in another computer. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and terms are used herein solely for convenience and such words and terms should be interpreted as referring to various objects and actions that are generally understood in various forms and equivalencies by persons of ordinary skill in the art. For example, the word "drone" as used herein should be generally understood as equivalent to other words and phrases such as "unmanned aerial vehicle" and "unmanned aircraft." As another example, words such as "raise," "lift," and "elevate" may be used interchangeably in this disclosure. It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

In terms of a general overview, certain embodiments described in this disclosure are directed to systems and methods for lifting one or more drones to a desired height before allowing the drones to take flight on their own power. In one exemplary embodiment, a drone elevator system includes a cable that is engaged to a pair of pulleys in a loop configuration. A first pulley of the pair of pulleys is coupled to a lighter-than-air craft such as a balloon, a blimp, or a dirigible. In other instances, the first pulley of the pair of pulleys is coupled to a powered aircraft, a kite, or a tower. The second pulley is attached to a motor. The lighter-than-air craft can be moved upwards so as to raise the first pulley skywards and place the looped cable at an angle with respect to the ground. The motor is then operated to rotate the second pulley for moving the looped cable. The cable includes a set of tethers each of which can be used to tether a drone. Each tether includes an extension arm that prevents the tethered drone from making contact with the cable while the tethered drone is being lifted. Each tethered drone can be launched after being lifted to a desired height.

FIG. 1 illustrates a first exemplary embodiment of a drone elevator system 100 in accordance with the disclosure. The system 100 can include a looped cable 110 engaged at one end to a first pulley 114 and to a second pulley 113 at an opposing end. In this exemplary embodiment, a lighter-than-air craft 105 is coupled to the first pulley 114. The coupling may be carried out by attaching one or more cables to a lift bar 170 that is attached to the first pulley 114. The lift bar 170 is configured to allow the first pulley 114 to freely rotate on its axle 171.

In another exemplary embodiment, a winch may be coupled to the first pulley 114 by means of a cable that is attached to the lift bar 170. The cable can be moved by the winch to lift or to lower the first pulley 114. In one exemplary case, the winch implementation can be carried out by using a crane having a cable with a hook.

The lighter-than-air craft 105 and the winch system are merely two examples of a lifting mechanism for lifting the first pulley 114. In other implementations, other types of apparatuses, structures, and systems may be used for lifting the first pulley 114.

The lighter-than-air craft 105 can be any of various types of craft such as a blimp, a dirigible, or an airship. In one exemplary implementation, the lighter-than-air craft 105 can be a balloon that can be raised or lowered by inflating or deflating the balloon. In another exemplary implementation, the lighter-than-air craft 105 can be an airship that is maneuverable for setting the looped cable 110 at a desired angle with respect to the ground (or with respect to a loading surface 117 of a loading platform 115).

The second pulley 113 is coupled to a motor 120 that can be operated for rotating the second pulley 113. In this exemplary embodiment, the second pulley 113 is coupled to the motor 120 by a belt 121, which causes the second pulley 113 to rotate in a clockwise direction when the motor 120 is operated. The motor 120 may be located on the loading platform 115, which can be a stationary structure or can be a movable structure. For example, in one implementation, the loading platform 115 is a movable structure such as flatbed of a vehicle that can be moved from one location to another. In another implementation, the loading platform 115 can be a stationary structure such as a deck located in a parking lot or near a warehouse.

The looped cable 110 includes a number of tethers such as a first tether 130, a second tether 160, and a third tether 165. In this example, each of the tethers is substantially identical to the other tethers. In another example, one or more of the tethers can be different than other tethers. In yet another example, the looped cable 110 may include a single tether for launching a single drone (rather than multiple drones).

Each tether is fixedly attached to the looped cable 110 such that the fixedly attached tether moves along with the looped cable 110 when the looped cable 110 is moved. Each tether includes an extension arm having one or more attachment elements for attaching a drone to the tether. For example, the first tether 130 includes an extension arm 132 having an attachment element 131 for attaching a first drone 125 to the first tether 130. The attachment element 131 can include various components such as a wire, a hook, an elastic cord, and/or a clamp.

For example, the attachment element 131 can include a clamp that is activated by a wireless signal transmitted by a radio transceiver 155. The clamp can be activated to release the first drone 125 after the first drone 125 has been raised to a desired height. The radio transceiver 155 may also include circuitry for controlling the first drone 125 after the first drone 125 has been released from the first tether 130 (and optionally, for controlling one or more other drones released from their tethers).

In an exemplary method of operation of the drone elevator system 100, the lighter-than-air craft 105 is operated to raise the first pulley 114 to a desired height. The desired height may be determined on the basis of various parameters such as for example, a desired angle (θ degrees) of a longitudinal axis 116 of the looped cable 110 with respect to the ground (or with respect to the loading surface 117 of the loading platform 115); an elevation that would allow launching of multiple drones from various heights; a lifting capacity of the lighter-than-air craft 105; a load bearing capacity of the various tethers; and/or a weight of one or more drones.

In a first exemplary launch procedure, after the lighter-than-air craft 105 is operated to raise the first pulley 114, the motor 120 is operated to rotate the second pulley 113 for lifting the first tether 130 to a desired height. The first drone 125 may then be launched by releasing the first drone 125 from the first tether 130. The first drone 125 can be a delivery drone for delivering a package 126. The package 126 can be attached to the first drone 125 using one or more of various attaching elements such as cables, clamps, and hooks. Upon release from the first tether 130, the first drone 125 may fly to a delivery destination either autonomously or under control of the radio transceiver 155. The first drone 125 may return later on from the delivery location and land at a suitable landing site such as the loading surface 117 of the loading platform 115 or a warehouse.

The second drone 135 can be concurrently released from the second tether 160 and fly to another destination. The third drone 140 (and other drones if attached to other tethers) can be released in a similar manner. Each drone, such as a fourth drone 145, can be placed upon the loading surface 117 of the loading platform 115 for purposes of attaching the fourth drone 145 to an available tether. The available tether may be one of several tethers that are available on a second section 112 of the looped cable 110 after drones have been launched from their tethers on a first section 111 of the looped cable 110.

In this first exemplary launch procedure, the motor 120 is operated to rotate the second pulley 113 and move the looped cable 110 for raising the first pulley 114 to 400 feet, for example. Any height may be used herein. One or more of the other drones may be launched at various heights with respect to the first drone 125 without further operating the motor 120. For example, the second drone 135 may be launched at a second height that is lower than the first height (300 feet, for example). The second drone 135 may be launched at the same time as the first drone 125 or can be launched at a different time. The heights at which the various drones are launched may be based on factors such as the angle (θ degrees) of the longitudinal axis 116 of the looped cable 110 with respect to the ground, the length of the looped cable 110, and a separation distance (d1) between the first section 111 of the looped cable 110 and the second section 112 of the looped cable 110.

In a second exemplary launch procedure, after the lighter-than-air craft 105 is operated to raise the first pulley 114, the motor 120 is operated to rotate the second pulley 113 and move the looped cable 110 for lifting the first tether 130 to 400 feet, for example. The motor may optionally be stopped at this time, and the first drone 125 released from the first tether 130 while the tether is either stationary or in motion. The motor 120 may be operated once again to rotate the second pulley 113 and move the looped cable 110 for lifting the second tether 160 to the same height (400 feet), at which time the second drone 135 can be released from the second tether 160. The motor 120 can then similarly be operated further for launching the third drone 140 (and other drones) from the same height (400 feet). In this second exemplary launch procedure, the various drones are launched sequentially.

In accordance with the disclosure, the extension arm 132, which is a part of the first tether 130, can be a rigid component such as a rod or a bar. The extension arm 132 has a proximal end anchored to the looped cable 110 and a distal end coupled to the attachment element 131. The proximal end of the extension arm 132 is anchored to the looped cable 110 in a manner that configures the extension arm 132 to extend away from the looped cable 110. This configuration prevents the first drone 125 from moving around (swaying, twisting, or swinging) and making contact with the first section 111 of the looped cable 110 when the first tether 130 is being moved upwards. The extension arm 132 further prevents the first drone 125 from moving around (swinging due to wind conditions, for example) and making contact with the first section 111 of the looped cable 110 if the motor 120 is stopped after the first tether 130 has been raised to the desired height.

In accordance with one embodiment of the disclosure, the length (d2) of the extension arm 132 is selected to be less than the separation distance (d1) between the first section 111 of the looped cable 110 and the second section 112 of the looped cable 110. The length of each of the other extension arms is similarly selected to be less than the separation distance (d1) between the first section 111 of the looped cable 110 and the second section 112 of the looped cable 110. Selecting the length (d2) of the extension arm 132 to be less than the separation distance (d1) ensures that the first drone 125 does not make contact with the first section 111 of the looped cable 110 when the first drone 125 is being raised or when stopped.

Conversely, the separation distance (d1) between the first section 111 of the looped cable 110 and the second section 112 of the looped cable 110 can be configured to be greater than the length (d2) of the extension arm 132 (as well as the length of each of the other extension arms). In accordance with the first exemplary embodiment of the disclosure that is illustrated in FIG. 1, the separation distance (d1) can be configured by selecting one or both of the second pulley 113 and the first pulley 114 of a desired diameter. For example, if desired to provide a separation distance (d1) of 5 feet, each of the second pulley 113 and the first pulley 114 can be selected to have a diameter equal to about 5 feet. The first section 111 of the looped cable 110 and the second section 112 of the looped cable 110 are automatically configured to operate in parallel with each other when the diameter of the second pulley 113 is substantially equal to the diameter of the first pulley 114. The length (d2) of the extension arm 132 (as well as the length of each of the other extension arms) may be set to 1 foot, for example, so as to prevent the first drone 125 (as well as other drones) coming in contact with the first section 111 of the looped cable 110 when the first tether 130 is being raised (or when stopped at a desired height).

The length (d2) of the extension arm 132 (as well as the length of each of the other extension arms) may also be set on the basis of other factors such as a size of the first drone 125 (width, for example), a length of a component such as one or more cables or wires that can be part of the attachment element 131, and a trajectory of movement (such as when swinging) of the first drone 125 due to factors such as weight and wind conditions.

Furthermore, in one exemplary implementation, the extension arm 132 (as well as other extension arms) may be configured to be adjustably set to one of various lengths. For example, the extension arm 132 may incorporate a telescoping architecture that allows the length (d2) to be adjusted in accordance with wind conditions at any given time or based on characteristics of a package (such as width, weight, shape) carried by the first drone 125.

Figure 2:
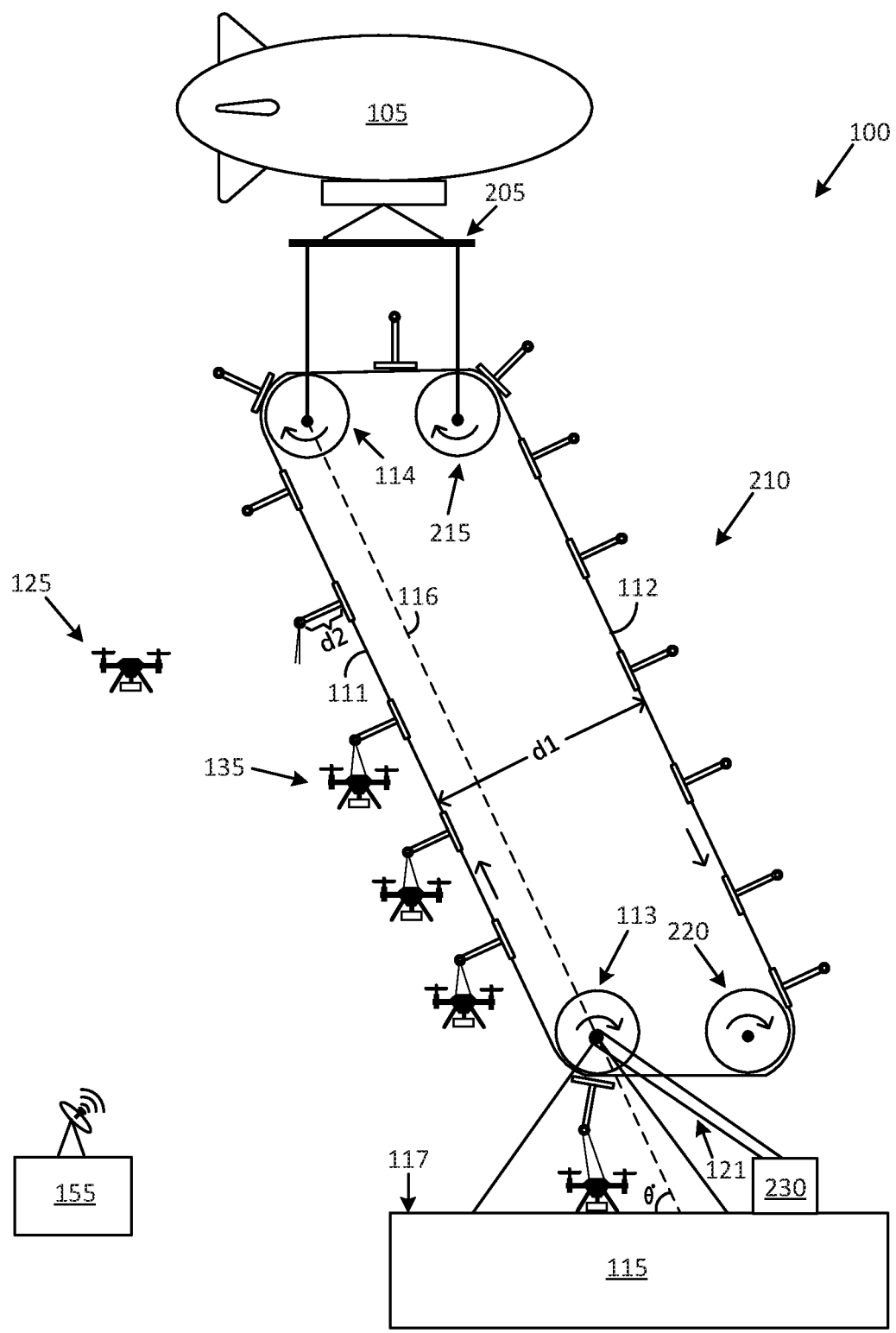
FIG. 2 illustrates a second exemplary embodiment of a drone elevator system in accordance with the disclosure.

FIG. 2 illustrates a second exemplary embodiment of the drone elevator system 100 in accordance with the disclosure. The system 100 can include several components that are identical or substantially similar to components having the same reference numerals and described above with reference to the system 100. However, in this second exemplary embodiment, the looped cable 210 is engaged at one end to a first pair of pulleys (the first pulley 114 and a third pulley 215) and to a second pair of pulleys (the second pulley 113 and a fourth pulley 220) at an opposing end.

In this exemplary embodiment, the lighter-than-air craft 105 is engaged to the first pair of pulleys. The engagement may be carried out by attaching one or more cables to a lift bar 205. A proximal end of the lift bar 205 is attached to the first pulley 114 and a distal end is attached to the third pulley 215. The lift bar 205 is configured to allow each of the first pulley 114 and the third pulley 215 to freely rotate on their respective axels. In another exemplary embodiment, a cable of a winch system may be engaged to the lift bar 205 in lieu of the lighter-than-air craft 105. The cable can be moved by the winch to lift the lift bar 205 for lifting the first pair of pulleys and to subsequently lower the lift bar 205 for lowering the first pair of pulleys. The lighter-than-air craft 105 and the winch system are merely two examples of a lifting mechanism for lifting the first pair of pulleys.

The second pair of pulleys is coupled to a motor 230 that can include the belt 121 coupled to the pulley 113. The motor 230 may be configured to cause the looped cable 210 to rotate for moving one or more tethers to a desired height.

In accordance with this second exemplary embodiment, the length (d2) of the extension arm 132 is selected to be less than the separation distance (d1) between the first section 111 of the looped cable 110 and the second section 112 of the looped cable 110. The length of each of the other extension arms is similarly selected to be less than the separation distance (d1) between the first section 111 of the looped cable 110 and the second section 112 of the looped cable 110. Selecting the length (d2) of the extension arm 132 to be less than the separation distance (d1) ensures that the first drone 125 does not make contact with the first section 111 of the looped cable 110 when the first drone 125 is being raised or when stopped.

Conversely, the separation distance (d1) between the first section 111 of the looped cable 110 and the second section 112 of the looped cable 110 can be configured to be greater than the length (d2) of the extension arm 132 (as well as the length of each of the other extension arms). In accordance with this second exemplary embodiment of the disclosure, the separation distance (d1) can be configured by selecting a first separation distance between the first pulley 114 and the third pulley 215 and a second separation distance between the second pulley 113 and the fourth pulley 220. In an exemplary implementation the second separation distance is the same as the first separation distance. The diameter of each of the first pulley 114 and the third pulley 215 is selected to be less than the first separation distance so that the first pulley 114 and the third pulley 215 do not interfere with each other when rotating. For example, the diameter of each of the first pulley 114 and the third pulley 215 may be selected to be about 3 feet when the first separation distance (d1) between the first pulley 114 and the third pulley 215 is about 12 feet. The diameter of each of the second pulley 113 and the fourth pulley 220 may be similarly selected to be less than the second separation distance (d1, for example) so that the second pulley 113 and the fourth pulley 220 do not interfere with each other when rotating.

The length (d2) of the extension arm 132 (as well as the length of each of the other extension arms) may be set to 1 foot, for example, so as to prevent the first drone 125 (as well as other drones) coming in contact with the first section 111 of the looped cable 110 when the first tether 130 is being raised (or when stopped at a desired height). The length (d2) of the extension arm 132 (as well as the length of each of the other extension arms) may also be set on the basis of other factors such as a size of the first drone 125 (width, for example), a length of a component such as one or more cables or wires that can be part of the attachment element 131, and a trajectory of movement (such as when swinging) of the first drone 125 due to factors such as weight and wind conditions.

In one exemplary implementation, the extension arm 132 (as well as other extension arms) may be configured to be adjustably set to one of various lengths. For example, the extension arm 132 may incorporate a telescoping architecture that allows the length (d2) to be adjusted in accordance with wind conditions at any given time or based on characteristics of a package (such as width, weight, shape) carried by the first drone 125.

Figure 3:
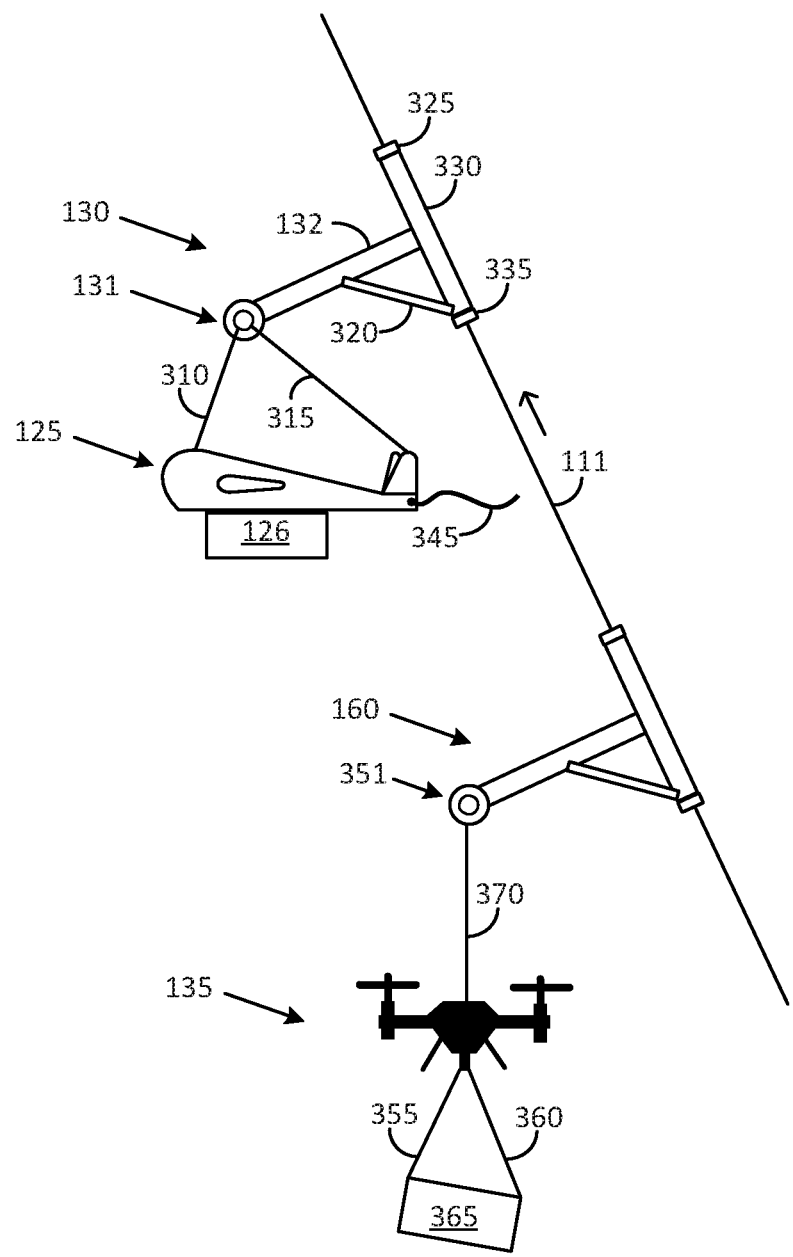
FIG. 3 illustrates some exemplary components of a drone elevator system in accordance with the disclosure.

FIG. 3 illustrates some exemplary components of the drone elevator system 100 in accordance with the disclosure. The exemplary components include the first tether 130 and the second tether 160. The first tether 130 may generally conform to the shape of a bracket extending perpendicular to the looped cable 110. In the exemplary illustration, the first tether 130 is shown to extend perpendicular to the first section 111 of the looped cable 110. The first tether 130 can include a cylindrical section 330 that may be fixedly attached to the looped cable 110 using one or more attachment elements such as a first clamp 325 and a second clamp 335. The fixed attachment prevents the cylindrical section 330 from rotatably moving with respect to the looped cable 110. The extension arm 132 may be a part of the cylindrical section 330 or attached to the cylindrical section 330 (by welding, for example). An angle support 320 may be provided to support the extension arm 132 to allow the first tether 130 to bear the weight of a heavy drone.

In an alternative implementation, the cylindrical section 330 may be rotatably attached to the looped cable 110, thereby allowing the first tether 130 to adapt to various orientations of the looped cable 110 when the looped cable 110 is in motion. In this implementation, a weight of the first drone 125 automatically orients the first tether 130 downwards at a distance from the first section 111 of the looped cable 110. The distance is determined in part by the length (d2) of the extension arm 132 and the angle (θ degrees) of the longitudinal axis 116 of the looped cable 110 with respect to the ground (angle is illustrated in FIG. 1).

The attachment element 131 can be used for attaching the first drone 125 to the first tether 130. In this example, the first drone 125 is shaped like an airplane and a pair of cables or cords are used to attach the first drone 125 to the attachment element 131. A first cable 310 of the pair of cables has a fixed length that is selected to permit the first drone 125 to hang below the first tether 130 without coming in contact with the second tether 160 below. The fixed length may also be selected to prevent a tail section of the first drone 125 from coming in contact with the looped cable 110. A second cable 315 of the pair of cables can have a length that is adjustable in various ways. For example, the second cable 315 can be an elastic cable having hooks at either end. One of the hooks is attached to the attachment element 131 after the first cable 310 is used to hang the first drone 125 from the attachment element 131. The other hook is then attached to a tails section of the first drone 125.

As another example, the second cable 315 can be a retractable cable. The first cable 310 is a fixed length cable that is used to hang the first drone 125 from the attachment element 131. One end of the second cable 315 is coupled to the tail section of the first drone 125. Another end of the second cable 315 is coupled to a spool that may be a part of the attachment element 131. The length of the second cable 315 may then be adjusted by rotating the spool for setting any suitable launch angle for the first drone 125.

In yet another exemplary implementation, one or more ribbons such as a ribbon 345 may be attached to the tail section of the first drone 125. The ribbon 345 operates to stabilize the first drone 125 when the first drone 125 is anchored to the first tether 130. The stabilization is carried out in a manner that is comparable to a tail of a kite. The ribbon 345 may be retracted by using a spool (not shown) in the tail section of the first drone 125 before the first drone 125 is released from the first tether 130 for flight. The length of the ribbon 345 may be selected on the basis of various factors such as wind conditions and weight of a package 126 carried by the first drone 125.

The second tether 160 may be substantially identical to the first tether 130. The second drone 135 may be attached to an attachment element 351 of the second tether 160 by using a cable 370. In this example, the second drone 135 has a set of rotors pointing upwards. The length of the cable 370 is selected so as to prevent the second tether 160 coming in contact with the set of rotors when the rotors are in operation and/or to prevent the second drone 135 from coming in contact with the first section 111 of the looped cable 110. A package 365 is attached to the second drone 135 by a pair of cables. The first cable 355 of the pair of cables may be identical in structure and operation to the first cable 310 described above. The second cable 360 of the pair of cables may be identical in structure and operation to the second cable 315 described above.

In one exemplary case, a container (such as a box or a basket) may be attached to the second drone 135 in lieu of the package 365. The package 365 may be placed inside the container. This configuration can be useful when the package 365 is unsuitable to be attached directly to the second drone 135, such as when the package 365 is a small item. The container may be configured for transporting various types of items. For example, the container may include protective padding to protect a fragile item.

Figure 4:
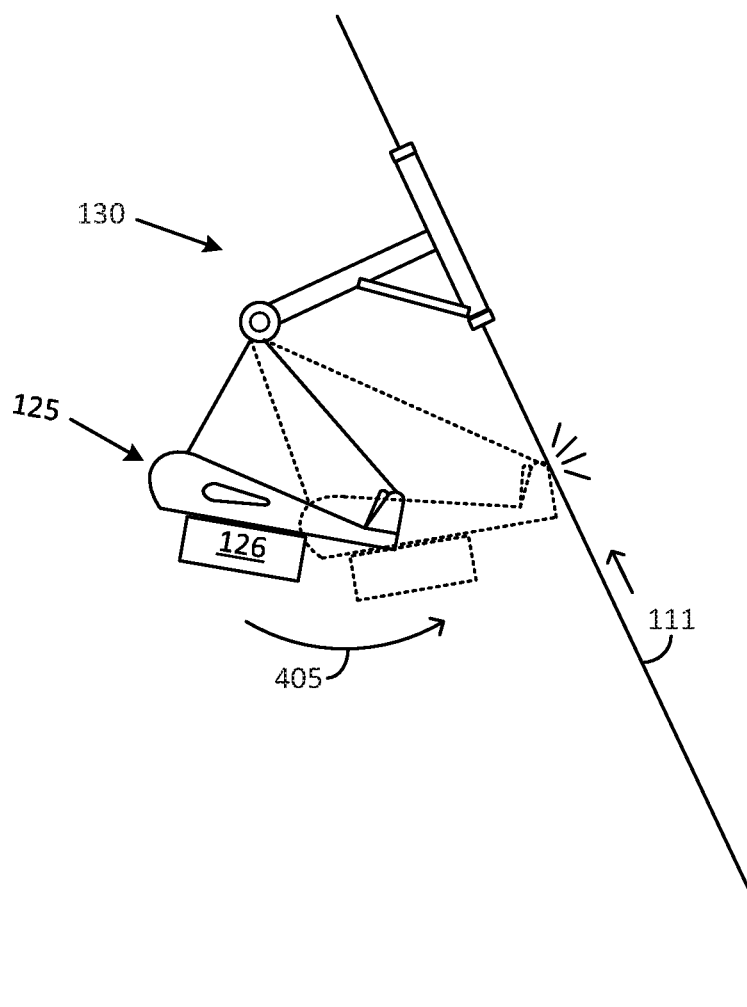
FIG. 4 illustrates an exemplary operation associated with a drone elevator system in accordance with the disclosure.

FIG. 4 illustrates an exemplary mode of operation associated with the drone elevator system 100 in accordance with the disclosure. The illustration pertains to the first drone 125 anchored to the first tether 130 as shown in FIG. 3. However, the description is equally applicable to other drones attached to other tethers. In this example scenario, the first drone 125 is subjected to windy conditions that cause the first drone 125 to sway in various directions such as a first direction that is indicated by an arrow 405. A sensor (not shown) that may be provided in the first drone 125 senses the movement of the first drone 125 and conveys the information to a controller (not shown) provided in the first drone 125. The controller may transmit control signal to one or more components of the first drone 125 such as an engine of the first drone 125 to counteract the sway by moving the first drone 125 in a second direction that is opposite to the first direction. One or more other components of the first drone 125, such as the rotors of the first drone 125, may be adjusted for setting the second direction of movement of the first drone 125.

Example Embodiments

In some instances, the following examples may be implemented together or separately by the systems and methods described herein.

Example 1 may include a drone elevator system comprising: a looped cable engaged to at least a first pulley at a first end and a second pulley at a second end, the looped cable having a first separation distance between a first section of the looped cable and a second section of the looped cable that is parallel to the first section; a lifting mechanism that is engaged to at least the first pulley for raising the first pulley and placing the looped cable at an angle with respect to the ground; a motor coupled to at least one of the first pulley or the second pulley, the motor operable to move the looped cable; and a first tether comprising a first extension arm extending away from the looped cable, the first extension arm having a proximal end anchored to the looped cable and a distal end having one or more attachment elements for detachably attaching a first drone to the first extension arm.

Example 2 may include the drone elevator system of example 1 and/or some other example herein, wherein the lifting mechanism is at least one of a lighter-than-air craft or a powered aircraft or a kite or a tower.

Example 3 may include the drone elevator system of example 1 and/or some other example herein, wherein the first extension arm has a length that is less than the first separation distance between the first section of the looped cable and the second section of the looped cable.

Example 4 may include the drone elevator system of example 1 and/or some other example herein, wherein a diameter of at least one of the first pulley or the second pulley is selected to provide the first separation distance between the first section of the looped cable and the second section of the looped cable.

Example 5 may include the drone elevator system of example 1 and/or some other example herein, wherein the first pulley is paired with a third pulley and the second pulley is paired with a fourth pulley in an arrangement that provides the first separation distance between the first section of the looped cable and the second section of the looped cable.

Example 6 may include the drone elevator system of example 5 and/or some other example herein, further comprising a loading platform, and wherein a third section of the looped cable located between the first pulley and the third pulley is configured to move horizontal to a loading surface of the loading platform when the looped cable is in motion.

Example 7 may include the drone elevator system of example 1 and/or some other example herein, further comprising: a second tether comprising a second extension arm extending away from the looped cable, the second extension arm having a proximal end anchored to the looped cable and a distal end having one or more attachment elements for detachably attaching a second drone to the second extension arm.

Example 8 may include the drone elevator system of example 1 and/or some other example herein, wherein the first drone is a delivery drone and the one or more attachment elements of the first extension arm are configured to allow detaching of the first drone from the first extension arm when the first tether has been lifted to a first height.

Example 9 may include a method comprising: detachably attaching a first drone to a first tether in a cable of a drone elevator system; operating the drone elevator system to lift the first tether to a first height; preventing the first drone from making contact with at least the cable when the drone elevator system is operated to lift the first tether to the first height; and launching the first drone from the drone elevator system, the launching comprising detaching the first drone from the first tether after lifting the first tether to the first height.

Example 10 may include the method of example 9 and/or some other example herein, wherein the first tether comprises one of a rod or a bar having a proximal end anchored to the cable and a distal end coupled to one or more attachment elements for attaching the first drone to the first tether, the one of the rod or the bar extending away from the cable in an arrangement that prevents the first drone from making contact with the cable when the drone elevator system is operated to lift the first tether to the first height.

Example 11 may include the method of example 10 and/or some other example herein, wherein the one or more attachment elements comprise at least one of a wire, a hook, or a clamp.

Example 12 may include the method of example 9 and/or some other example herein, wherein preventing the first drone from making contact with the cable comprises: sensing a swaying of the first drone in a first direction when the drone elevator system is operated to lift the first tether to the first height; and counteracting the swaying by operating an engine of the first drone to move the first drone in a second direction that is opposite to the first direction.

Example 13 may include the method of example 9 and/or some other example herein, further comprising: attaching a ribbon as a tail to the first drone; and utilizing the tail to stabilize the first drone at least when the drone elevator system is operated to lift the first tether to the first height and when the first tether has been lifted to the first height.

Example 14 may include the method of example 9 and/or some other example herein, further comprising: attaching a second drone to a second tether in the cable of the drone elevator system; operating the drone elevator system to lift the second tether to a second height when lifting the first tether to the first height; preventing the second drone from making contact with at least the cable when the drone elevator system is operated to lift the second tether to the second height; and launching the second drone from the drone elevator system, the launching comprising detaching the second drone from the second tether after lifting the first tether to the second height.

Example 15 may include the method of example 14 and/or some other example herein, wherein lifting the second drone to the second height is carried out concurrently to lifting the first tether to the first height.

Example 16 may include a method comprising: providing a drone elevator system that includes a cable having at least a first tether, the first tether including an extension arm having a proximal end anchored to the cable; detachably attaching a first drone to a distal end of the extension arm; and operating the drone elevator system to lift the first tether to a first height, the extension arm preventing the first drone from making contact with the cable.

Example 17 may include the method of example 16 and/or some other example herein, wherein detachably attaching the first drone to the distal end of the extension arm comprises one of using a wire, a hook, a clamp, or a container that is a part of the extension arm.

Example 18 may include the method of example 16 and/or some other example herein, further comprising: sensing a swaying of the first drone in a first direction when the drone elevator system is operated to lift the first tether to the first height; and counteracting the swaying by operating an engine of the first drone to move the first drone in a second direction that is opposite to the first direction.

Example 19 may include the method of example 16 and/or some other example herein, further comprising: attaching a ribbon as a tail to the first drone; and utilizing the tail to stabilize the first drone at least when the drone elevator system is operated to lift the first tether to the first height and when the first tether has been lifted to the first height.

Example 20 may include the method of example 16 and/or some other example herein, further comprising: attaching a second drone to a second tether in the cable of the drone elevator system; operating the drone elevator system to lift the second tether to a second height when lifting the first tether to the first height; preventing the second drone from making contact with at least the cable when the drone elevator system is operated to lift the second tether to the second height; and launching the second drone from the drone elevator system, the launching comprising detaching the second drone from the second tether after lifting the first tether to the second height.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
    detachably attaching a first drone to a first tether in a cable of a drone elevator system, wherein the first tether comprises a plurality of attachment elements having a clamp that is activated by a wireless signal, wherein the drone elevator system further comprises:
        the cable, wherein the cable comprises a looped cable engaged to at least a first pulley at a first end and a second pulley at a second end, the looped cable having a first separation distance between a first section of the looped cable and a second section of the looped cable that is parallel to the first section, wherein the drone elevator system is configured to move the plurality of attachment elements along the first section of the looped cable, around the first pulley, and along the second section of the cable;
    operating the drone elevator system to lift the first tether to a first height;
    preventing the first drone from making contact with at least the cable when the drone elevator system is operated to lift the first tether to the first height; and
    launching the first drone from the drone elevator system, the launching comprising detaching the first drone from the first tether after lifting the first tether to the first height.

2. The method of claim 1, wherein the first tether comprises one of a rod or a bar having a proximal end anchored to the cable and a distal end coupled to plurality of attachment elements for attaching the first drone to the first tether, the one of the rod or the bar extending away from the cable in an arrangement that prevents the first drone from making contact with the cable when the drone elevator system is operated to lift the first tether to the first height.

3. The method of claim 2, wherein the plurality of attachment elements comprise at least one of a wire or a hook.

4. The method of claim 1, wherein preventing the first drone from making contact with the cable comprises:
    sensing a swaying of the first drone via a sensor in a first direction when the drone elevator system is operated to lift the first tether to the first height; and counteracting the swaying by operating an engine of the first drone to move the first drone in a second direction that is opposite to the first direction.

5. The method of claim 1, further comprising:
attaching a ribbon as a tail to the first drone, wherein a length of the ribbon is determined based at least in part on a wind condition and a weight of a package carried by the first drone; and
utilizing the tail to stabilize the first drone at least when the drone elevator system is operated to lift the first tether to the first height and when the first tether has been lifted to the first height.

6. The method of claim 1, further comprising:
attaching a second drone to a second tether in the cable of the drone elevator system;
operating the drone elevator system to lift the second tether to a second height when lifting the first tether to the first height, wherein the second height is based at least in part on an angle of the cable with respect to a ground and a distance between the first section of the looped cable and the second section of the looped cable;
preventing the second drone from making contact with at least the cable when the drone elevator system is operated to lift the second tether to the second height; and
launching the second drone from the drone elevator system, the launching comprising detaching the second drone from the second tether after lifting the second tether to the second height.

7. The method of claim 6, wherein lifting the second drone to the second height is carried out concurrently to lifting the first tether to the first height.

8. The method of claim 1, wherein the drone elevator system further comprises:
a lifting mechanism that is engaged to at least the first pulley for raising the first pulley and placing the looped cable at an angle with respect to a ground;
a motor coupled to at least one of the first pulley or the second pulley, the motor operable to move the looped cable; and
the first tether further comprising a first extension arm extending away from the looped cable, the first extension arm having a proximal end anchored to the looped cable and a distal end having the plurality of attachment elements.

9. The method of claim 8, wherein a diameter of at least one of the first pulley or the second pulley is selected to provide the first separation distance between the first section of the looped cable and the second section of the looped cable.

10. The method of claim 8, wherein the first pulley is paired with a third pulley and the second pulley is paired with a fourth pulley in an arrangement that provides the first separation distance between the first section of the looped cable and the second section of the looped cable.

11. The method of claim 10, wherein the drone elevator system further comprises a loading platform, and wherein a third section of the looped cable located between the first pulley and the third pulley is configured to move horizontal to a loading surface of the loading platform when the looped cable is in motion.

12. A method comprising:
providing a drone elevator system that includes a cable having at least a first tether, the first tether including a rigid extension arm having a proximal end anchored to the cable and a plurality of attachment elements having a clamp that is activated by a wireless signal, wherein the plurality of attachment elements comprise a cylindrical section fixedly attached to the cable, the rigid extension arm extending perpendicularly from the cylindrical section, and an angle support provided between the rigid extension arm and the cylindrical section, and wherein the drone elevator system further comprises:
the cable, wherein the cable comprises a looped cable engaged to at least a first pulley at a first end and a second pulley at a second end, the looped cable having a first separation distance between a first section of the looped cable and a second section of the looped cable that is parallel to the first section, wherein the drone elevator system is configured to move the plurality of attachment elements along the first section of the looped cable, around the first pulley, and along the second section of the cable;
detachably attaching a first drone to a distal end of the rigid extension arm; and
operating the drone elevator system to lift the first tether to a first height, the rigid extension arm preventing the first drone from making contact with the cable.

13. The method of claim 12, wherein detachably attaching the first drone to the distal end of the rigid extension arm comprises one of using a wire, a hook or a container that is a part of the rigid extension arm.

14. The method of claim 12, further comprising:
sensing a swaying of the first drone via a sensor in a first direction when the drone elevator system is operated to lift the first tether to the first height; and
counteracting the swaying by operating an engine of the first drone to move the first drone in a second direction that is opposite to the first direction.

15. The method of claim 12, further comprising:
attaching a ribbon as a tail to the first drone, wherein a length of the ribbon is determined based at least in part on a wind condition and a weight of a package carried by the first drone; and
utilizing the tail to stabilize the first drone at least when the drone elevator system is operated to lift the first tether to the first height and when the first tether has been lifted to the first height.

16. The method of claim 12, further comprising:
attaching a second drone to a second tether in the cable of the drone elevator system;
operating the drone elevator system to lift the second tether to a second height when lifting the first tether to the first height, wherein the second height is based at least in part on an angle of the cable with respect to a ground and a distance between the first section of the looped cable and the second section of the looped cable;
preventing the second drone from making contact with at least the cable when the drone elevator system is operated to lift the second tether to the second height; and
launching the second drone from the drone elevator system, the launching comprising detaching the second drone from the second tether after lifting the second tether to the second height.

17. The method of claim 12, wherein the drone elevator system further comprises:
a lifting mechanism that is engaged to at least the first pulley for raising the first pulley and placing the looped cable at an angle with respect to a ground;

a motor coupled to at least one of the first pulley or the second pulley, the motor operable to move the looped cable; and the first tether further comprising the rigid extension arm extending away from the looped cable, the rigid extension arm having the proximal end anchored to the looped cable and a distal end having the plurality of attachment elements.

18. The method of claim 17, wherein a diameter of at least one of the first pulley or the second pulley is selected to provide the first separation distance between the first section of the looped cable and the second section of the looped cable.

19. The method of claim 17, wherein the first pulley is paired with a third pulley and the second pulley is paired with a fourth pulley in an arrangement that provides the first separation distance between the first section of the looped cable and the second section of the looped cable.

20. The method of claim 19, wherein the drone elevator system further comprises a loading platform, and wherein a third section of the looped cable located between the first pulley and the third pulley is configured to move horizontal to a loading surface of the loading platform when the looped cable is in motion.

\* \* \* \* \*